Aug. 16, 1955 J. W. HARRISON 2,715,671
CONTACT ELEMENT
Filed Nov. 10, 1953 2 Sheets-Sheet 1

INVENTOR.
JAMES W. HARRISON
BY
ATTORNEY

Aug. 16, 1955  J. W. HARRISON  2,715,671
CONTACT ELEMENT

Filed Nov. 10, 1953  2 Sheets-Sheet 2

INVENTOR.
JAMES W. HARRISON
BY
*William M. Epes*
ATTORNEY

United States Patent Office 2,715,671
Patented Aug. 16, 1955

2,715,671

CONTACT ELEMENT

James W. Harrison, Woodbury, N. J., assignor to Oxy-Catalyst, Inc., a corporation of Pennsylvania Application November 10, 1953, Serial No. 391,191

10 Claims. (Cl. 219—38)

This invention is concerned with an element suitable for use in contacting operations that is, for operations involving contact between a fluid stream and a surface which may, desirably, have catalytic properties. The invention is also concerned with methods for manufacturing such element.

In carrying out contacting operations between a solid surface and a fluid stream for the purpose of heating, cooling, effecting a catalytic reaction, or otherwise treating the fluid stream in contact with the solid surface, it is essential that efficient contact be maintained between the fluid stream and the surface. In carrying out a catalytic reaction, for example, which occurs at the surface of the solid contact element, efficiency of contact between the solid surface and the fluid stream containing the reactants is essential for achieving complete reaction. It is also desirable that this efficient contact be achieved with the lowest possible pressure drop, that the contact element occupy the smallest possible volume per unit surface area provided for contact, and that the element be capable of being easily mounted and maintained in position in the contact chamber.

The object of the present invention is to provide a contact element having the above desirable characteristics, particularly one which may be constructed of electric resistance wire through which a current may be passed to heat the element.

Referring now to the drawings, Fig. 1 is a plan view of a contact element constructed in accordance with the invention;

Figure 1:
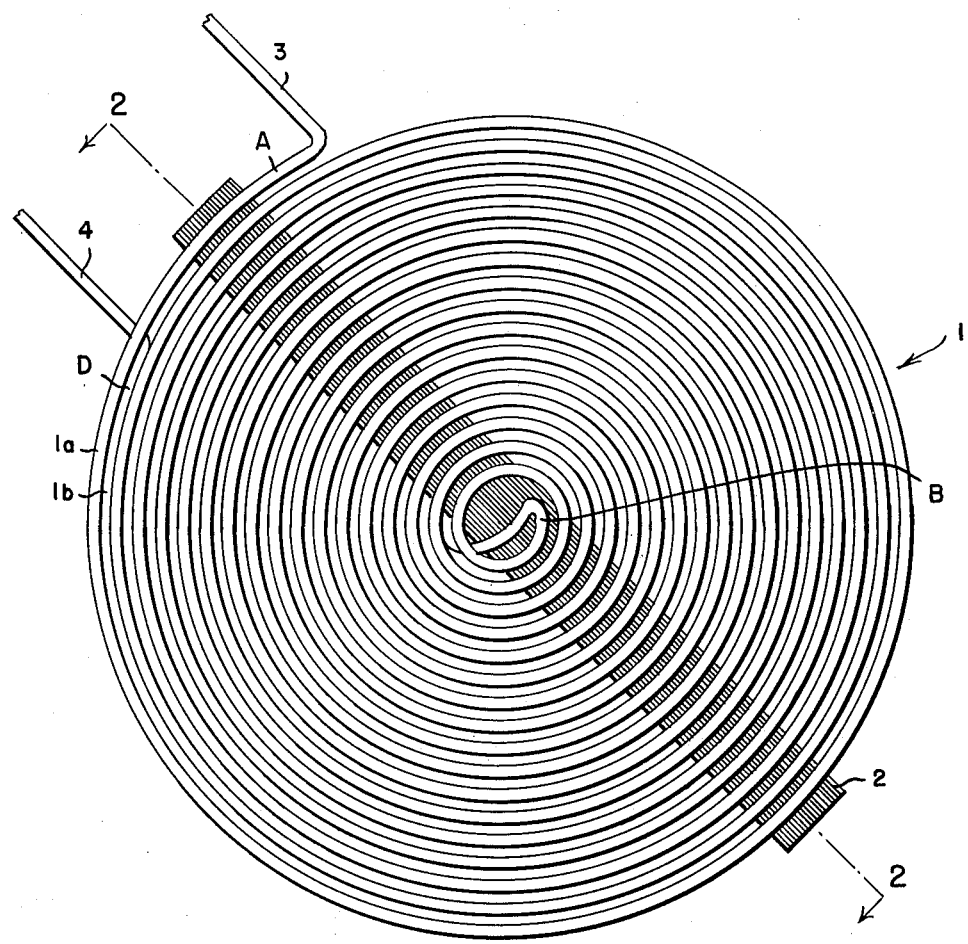
Figure 2:
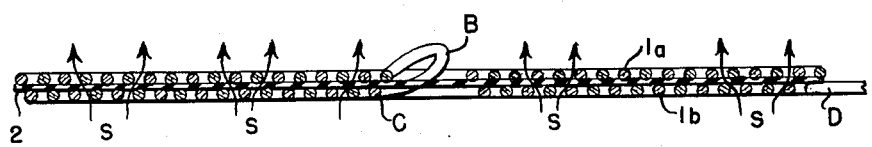
Fig. 2 is a cross-section taken on line 2—2 of Fig. 1.

Referring now particularly to Figs. 1 and 2, reference numeral 1 refers generally to a pair of spiral coils arranged in parallel, slightly-spaced-apart relationship. The upper coil as seen in these figures is designated by the reference numeral 1-a while the lower coil is designated by the reference numeral 1-b. The separation between the two coils is maintained by a flat narrow strip 2 of relatively stiff material. The strip 2 also serves to support the upper coil and lend stiffness to the assembly, and furthermore seals the small free space at the center thus preventing by-passing. Other means of maintaining a separation between the coils may be employed, although a thin narrow strip of stiff material arranged diametrically of the coil is preferred. Generally speaking, to minimize by-passing as fluids pass through the contact element over the surface of the wire, the separating strip should be thin relative to the diameter of the wire comprising the coil. For many applications where intimate contact is particularly desirable, the separating strip should have a thickness equivalent to approximately one-eighth the diameter of the wire making up the element. A strip of this thickness provides a separation between the upper and lower coils equivalent to one-half the diameter of the wire making up the coil as measured along the shortest line running between any two adjacent turns of the upper and lower coils.

In the embodiment shown, the coils are formed of electric resistance wire and are provided with leads 3 and 4 respectively whereby electric current may be passed through the coils in series. In such case, the strip 2 is preferably composed of material having dielectric properties and in addition heat resisting properties. A thin strip of mica has been found very desirable for this purpose.

The two coils making up the element are wound from a continuous length of wire and are connected at their centers. The top coil 1-a begins on the outer periphery at A and terminates at its innermost point B in a loop which is formed in a manner to be hereafter described. The lower coil 1-b which continues from loop B begins at point C on the inner portion of the spiral, being connected to the upper coil through loop B. The lower coil 1-b terminates at its outer periphery at point D.

It will be noted that the adjacent turns of each coil are spaced apart to permit the passage of fluids through the element. This may best be seen in Fig. 2 where the arrows S indicate the passage taken by fluid flowing upwardly (as seen in this figure) through the contact element. It will also be noted that the turns of each coil are disposed substantially in alignment with the openings between the turns of the other coil, that is, the turns of the two coils are in staggered relationship with respect to one another. This may be best seen in Fig. 2. This staggered relationship is very important in that it causes the gas flowing through the unit to be brought into intimate contact with the surfaces of the wire and minimizes by-passing.

Figure 5:
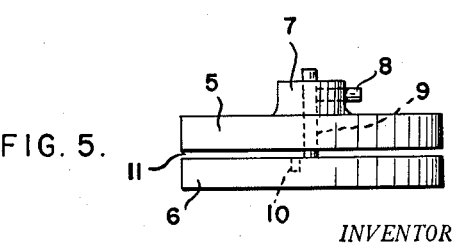
Fig. 5 is a side elevation of an arbor used in the manufacture of the element shown in Fig. 1.

To manufacture the element shown in Fig. 1, an arbor such as that shown in Fig. 5 may be used. This arbor consists of a pair of cylindrical plates 5 and 6 respectively. The top plate 5 is provided with an integral boss 7 while the lower plate 6 is provided with a spindle 9 attached thereto. The upper plate 5 is provided with a central bore to accommodate the spindle 9, and is shown in Fig. 5 in assembled position, the set screw 8 serving to maintain the upper plate 5 in fixed relationship to lower plate 6. To wind a coil, the two plates are spaced apart to provide an opening 11 equivalent to the diameter of the wire making up the contact element. The lower plate 6 is provided with a small hole 10 near the base of the spindle 9.

Figure 6:
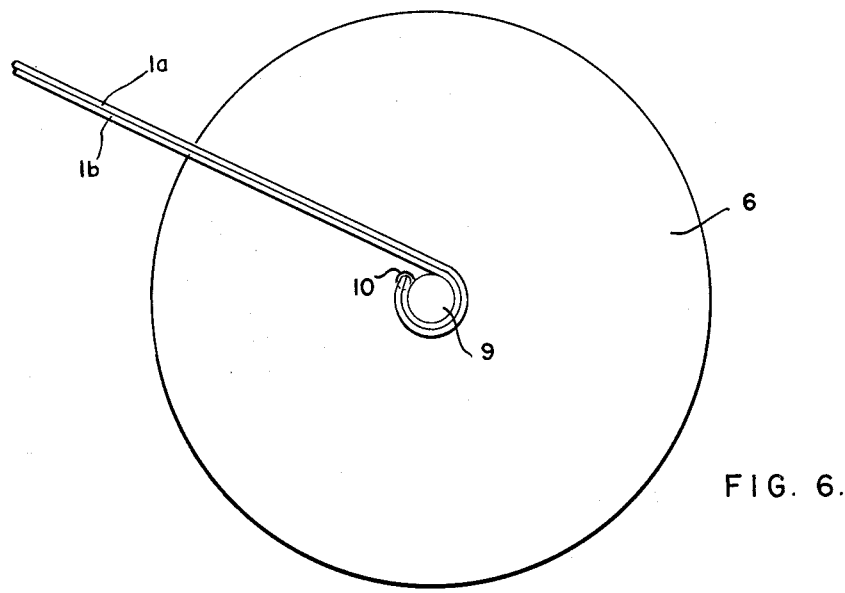
Fig. 6 is a plan view showing one stage of the manufacture of the element shown in Fig. 1.

In order to produce the element shown in Fig. 1, a length of wire is doubled to provide two parallel strands connected at one end. The doubled end is then inserted in the hole 10 to hold the wire in place, after which the two wires are laid flat against the surface of the plate 6 in the same plane (causing a bend in the wires at the lip of the hole 10 adjacent the doubled end). The top plate 5 is then placed and locked in position and the parallel wires are wound spirally around the spindle 9. Fig. 6 shows the beginning of the winding operation with the top plate 5 removed. During the winding operation the doubled wire is maintained in the same plane by virtue of the fact that the two plates are spaced apart by a distance equivalent to the diameter of the wire.

Figure 3:
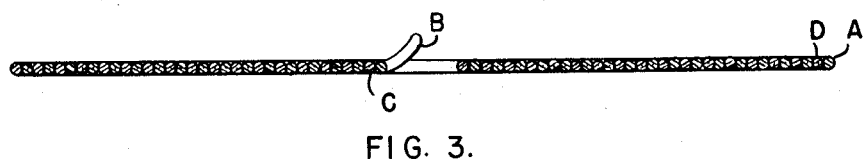
Fig. 3 is a cross-sectional view of the contact element shown in Fig. 1 at an intermediate stage of its manufacture.

After the winding has been completed, the coil is heat treated if necessary to set the wire in its spiral shape. It is then removed from the winding arbor by removing the top plate, after which the wire can be slipped off the spindle. At this point, there is but a single flat coil with adjacent turns contiguous to one another as shown in Fig. 3. It is apparent from the above that loop B which is shown in this figure and in Figs. 1 and 2 results from inserting the doubled end of the wire into the hole 10 during the manufacturing operation.

In order to produce the double coil structure shown in Figs. 1 and 2, alternate turns of this single flat coil as shown in Fig. 3 are displaced slightly to a closely adjacent parallel plane. To maintain this displacement the strip 2 is inserted between the two coils. In this manner, the staggered relation of the turns of the two coils as described above is automatically obtained. In practice, there may be some tendency for the turns to become displaced from this staggered relationship but readjustment to obtain this relation can be made easily.

As mentioned previously, in its particularly advantageous embodiment, the contact element of the invention is constructed of an electric resistance wire. In such case, the element has the particular advantage that the both ends of the continuous length of wire making up the element terminate at the periphery of the element, thus facilitating electrical connections. In the embodiment shown in Fig. 1 for example, electric current may be passed through lead 3 and will pass in series through the two coils, the other electrical connection being to lead 4.

Figure 4:
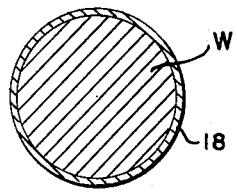
Fig. 4 is a cross-sectional view of the wire of which the contact element shown in Fig. 1 is made, shown provided with a thin film of catalytic material.

The contact element provided by the present invention is particularly suitable for use as a catalytic element, in which case of course, its surface would possess catalytic properties. An electric resistance wire, for example, may be provided with a thin coating of catalytic material as shown in Fig. 4 where the wire is shown in cross-section and indicated by the letter W and the thin catalytic film by the reference numeral 18.

While any type of catalytic coating may be employed, particularly desirable catalytic elements suitable for promoting catalytic oxidation reactions may be produced by providing the wire making up the element with a thin film of catalytic alumina or other catalytic inorganic oxide such as catalytic beryllia, magnesia or thoria, or mixtures of these with each other or other catalytic inorganic oxides, the thin film of catalytic oxide being then impregnated with a relatively small concentration of a catalytic metal such as platinum, palladium, silver, or similar metal having in combination with the oxide base properties of an oxidation catalyst. Catalysts of this general type are described in copending application Serial No. 312,152, filed September 29, 1952 by Eugene J. Houdry for Catalytic Structure and Composition, in co-pending application Serial No. 366,057, filed July 3, 1953 by Eugene J. Houdry et al. for Catalyst Structure, and in copending application Serial No. 365,858, filed July 3, 1953 by Eugene J. Houdry et al. for Catalytic Structure and Apparatus. As more fully described in these applications, catalytic films of this type should be extremely thin, of the order of .0005" to .015" in thickness, and when deposited upon a metallic wire should not usually exceed .0015" in thickness.

Figure 7:
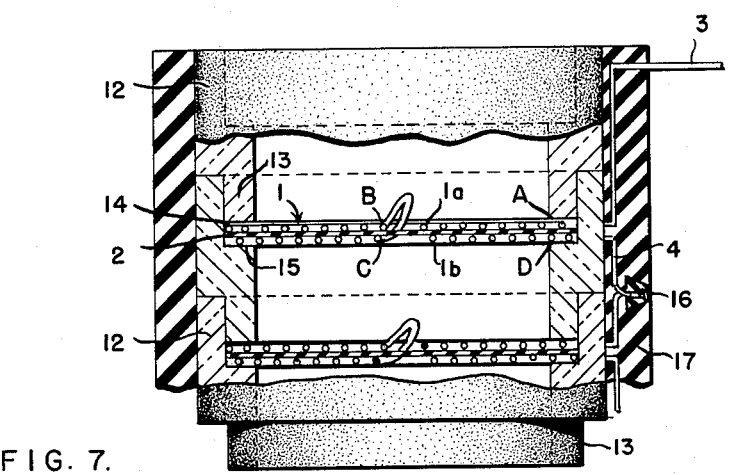
Fig. 7 is a view partly in section, showing several elements of the type illustrated in Fig. 1 assembled in a unit suitable for carrying out contacting operations.

Fig. 7 of the drawing shows a catalytic apparatus embodying the contact element provided by the present invention. An apparatus of this type is described in copending application Serial No. 365,858, above referred to. As may be seen in Fig. 7, the catalytic element 1 is shown mounted in a tube provided by a number of telescoping elements 12, preferably constructed of ceramic material. Each tubular element 12 is annular in shape and is adapted to telescope partially into another similar element. For this purpose, the wall thickness of each tubular element 12 is reduced internally at one end and externally at the other. The externally reduced portion provides a male portion 13 which fits into the internally reduced or female end of the next element. The length of the male portion 13 is adjusted so that an annular space 14 is left between the end of the male portion 8 and the internal integral shoulder 15 formed by the internal reduction of the wall thickness. The double coil 1 is supported in this annular space on the shoulder 15 and is held in place by the male portion 13 of the next tubular element.

In assembling the unit shown, the double coil 1, with its separating strip 2, is dropped onto the shoulder 15 from the female end, the leads 3 and 4 being accommodated by slots which extend through the wall of the tubular element from the female end down to the shoulder 15. After elements 1 are assembled in this manner, any desired number of these assemblies may be telescoped in the manner shown. The elements 1 may then be connected in series as shown in Fig. 7. Any desired method for connecting the coil leads together may be employed such as by twisting and thereafter inserting the twisted wires into a standard ceramic insulator such as insulator 16 illustrated. The free lead wires from the bottom and top elements 1 may then be connected to a source of electric current. Besides connecting the elements 1 electrically, the connections between the successive elements in the assembly also serve to fasten the telescoped elements 12 together as a single unit.

To prevent excessive heat loss, the entire assembly is preferably provided with an external layer of insulating material 17 which may be fibreglass, glass wool, asbestos or any other suitable insulator. The leads from the elements 1 and the connectors 13 may be accommodated by this insulation as illustrated. In use, a stream of reactants is introduced into one end of the assembly and flows successively over each element 1 in contact with the surface provided thereby. Excellent contact between the flowing reactants and the surface of the elements 1 is provided by virtue of the staggered relationship of the adjacent turns of the coils. The required temperature may be maintained at the surface by passing the proper amount of current through the elements to maintain surface temperature.

An apparatus such as that shown in Fig. 7, embodying the contact element of the invention provided with a thin film of oxidation catalyst, is particularly useful for eliminating trace amounts of oxidizable materials such as smoke, aerosols, or organic vapors of a poisonous or disagreeable nature. Such applications include for example the oxidation of cigarette smoke, cooking odors, or other such trace contaminants by passing the contaminated air into contact with the catalytically coated contact element maintained at activation temperature by an electric current.

As an illustration of the preparation of a contact element in accordance with the invention, a double coil such as that illustrated in Figs. 1 and 2 was prepared in the following manner. A 10 ft. length of a 22-gage resistance wire (80% nickel–20% chromium) was wound on a stainless steel arbor such as that illustrated in the drawings and after winding, the arbor, containing the coil, was heated uniformly to 1800° F. to 2000° F. After cooling, the two halves of the arbor were separated and the flat coil was removed. To separate the single coil into two superimposed coils, the two free ends of the wire were gently pulled apart from one another, causing the single coil to separate into two separate coils and the separation was maintained by inserting a thin narrow mica strip between the coils.

It is apparent, of course, that variations in the structure of the contact element and method of mounting it in a contact chamber are possible within the spirit of the invention. While an embodiment involving the use of a pair of interconnected coils has been employed to illustrate the invention, if desired, a greater number of such coils may be employed in superimposed, slightly-spaced-apart relationship, with the turns of each coil disposed in substantial alignment with the spaces between the adjacent turns of coils directly adjacent thereto. Such multiple coil arrangements may be connected to one another in series and if desired may be prepared by modification of the method described above involving the simultaneous winding of a plurality of parallel strands in the same plane.

It is to be understood that in the specification and in the claims which follow the word "wire" is used in a generic sense to include any relatively slender strand of material including metal and other types of material such as plastic, glass, etc., and includes strands of any cross-sectional shape such as circular, elliptical, triangular, square, hexagonal, etc.

Other variations or modifications not specifically described but within the spirit of the invention are also intended to be included and it is to be understood that the scope of the invention is not to be limited by the foregoing description, nor in any way except by the scope of the appended claims.

I claim:

1. An element suitable for use in contacting operations comprising a number of flat spiral coils, adjacent turns of each coil being spaced apart to permit the passage of fluids therethrough, said coils being arranged in parallel, slightly spaced apart relationship and such that the turns of each coil are disposed in substantial alignment with the openings between the turns of coils adjacent thereto, and means to maintain the slight separation between said coils.

2. An element suitable for use in contacting operations comprising a number of flat spiral coils formed from a continuous length of electric resistance wire and connected to one another, adjacent turns of each coil being spaced apart to permit the passage of fluids therethrough, said coils being arranged in parallel, slightly spaced apart relationship and such that the turns of each coil are disposed in substantial alignment with the openings between the turns of coils adjacent thereto, and means comprising a flat narrow strip of dielectric material inserted between said coils to maintain the slight separation between them.

3. An element suitable for use in contacting operations comprising a pair of flat spiral coils, adjacent turns of each coil being spaced apart to permit the passage of fluids therethrough, said coils being arranged in parallel, slightly spaced apart relationship and such that the turns of each coil are disposed in substantial alignment with the openings between the turns of the other, and means for maintaining the slight separation between said coils.

4. An element suitable for use in contacting operations comprising a pair of flat spiral coils formed from a continuous length of electric resistance wire and connected to one another at their centers, adjacent turns of each coil being spaced apart to permit the passage of fluids therethrough, said coils being arranged in parallel, slightly spaced apart relationship and such that the turns of each coil are disposed in substantial alignment with the openings between the turns of the other, and means comprising a flat, narrow strip of dielectric material inserted between said coils to maintain said slight separation.

5. An element in accordance with claim 4 which is provided with a lead connected to each of said coils at the periphery thereof whereby electric current may be passed through said coils in series.

6. A method of producing an element suitable for use in contacting operations comprising the steps of spirally winding parallel wires simultaneously in a single plane to produce a single flat spiral coil having contiguous turns and thereafter displacing alternate turns of said single coil to a closely adjacent parallel plane whereby adjacent turns of each coil are separated from one another by a distance substantially equivalent to the diameter of said wire.

7. A method in accordance with claim 6 in which said coil is heat treated after said winding operation.

8. A method in accordance with claim 6 in which a flat narrow strip is inserted between said coils to maintain the separation between them.

9. A method of producing an element suitable for use in contacting operations comprising the steps of doubling a continuous length of wire to produce two parallel wires connected at one end, spirally winding the doubled wire outwardly from the connected end in a single plane to produce a flat spiral coil having contiguous turns and thereafter displacing alternate turns of said single coil to a closely adjacent parallel plane, whereby adjacent turns of each coil are separated from one another by a distance substantially equivalent to the diameter of said wire.

10. A method in accordance with claim 9 in which the single flat coil is heat treated while on its winding arbor to set the wire in its spiral form, and in which a flat narrow strip is inserted between said coils to maintain the separation between them.

References Cited in the file of this patent

UNITED STATES PATENTS

| | | |
|---|---|---|
| 443,256 | Logan | Dec. 23, 1890 |
| 1,483,985 | Price | Feb. 19, 1924 |
| 1,728,144 | Warner et al. | Sept. 10, 1929 |
| 2,471,777 | Reinartz | May 31, 1949 |